May 7, 1963  E. SPINGIES ETAL  3,088,662
SYSTEM FOR TRANSMITTING VALUES BETWEEN MECHANICALLY DRIVEN
AND ELECTRICALLY CONTROLLED CALCULATING MACHINES
Filed Aug. 25, 1960  2 Sheets-Sheet 1

E. Spingies &
H. Rose
By
Lowry & Rinehart
ATTYS.

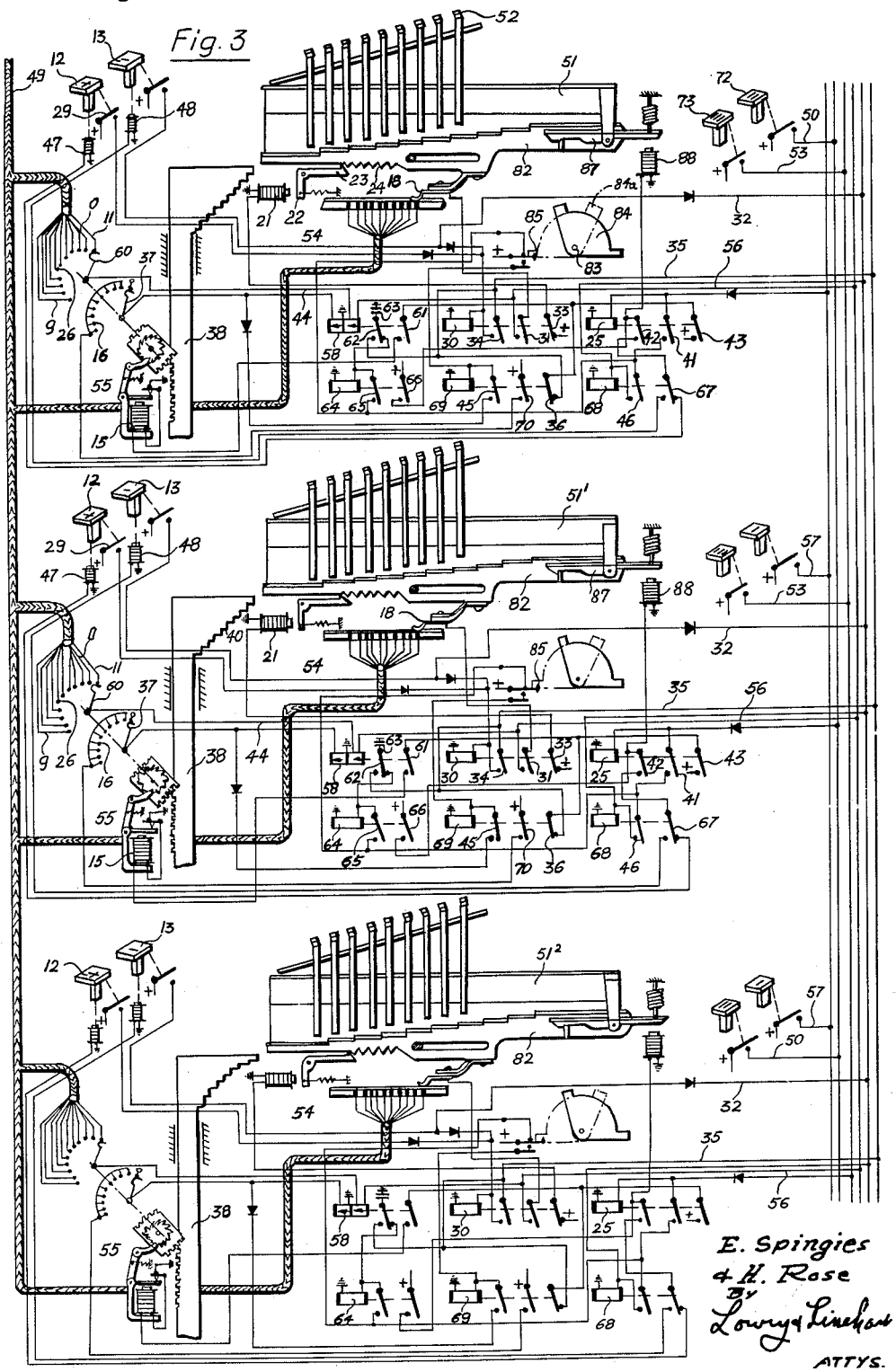

United States Patent Office 3,088,662
Patented May 7, 1963

3,088,662
SYSTEM FOR TRANSMITTING VALUES BETWEEN MECHANICALLY DRIVEN AND ELECTRICALLY CONTROLLED CALCULATING MACHINES
Erwin Spingies, 31 Bullskamp, Hamburg-Farmsen, Germany, and Herbert Rose, 9 Eichenallee, Wohltorf, Lauenburg, Germany
Filed Aug. 25, 1960, Ser. No. 51,839
Claims priority, application Germany Apr. 9, 1955
3 Claims. (Cl. 235—61)

This invention relates to certain new and useful improvements in a system for transmitting values between mechanically driven and electrically controlled calculating machines of all types and is a continuation-in-part of the application filed by us on March 20, 1956, Serial No. 572,643, now abandoned, and embodies improvements in the art thereover.

This invention relates to a system for transmitting values between mechanically driven and electrically controlled calculating machines, in which the figures are converted into electrical values by mechanical parts in a transmitter which transmits these electrical values to a receiver where they are reconverted into figures.

It is known to transmit calculating values from calculating machines to other office machines by impulses. It is also known to receive in calculating machines values in the form of impulses delivered from interconnected office machines.

The impulse control involves the disadvantage that the values may be incorrectly transmitted. The incorrect transmission of the figures represented by impulses may occur since impulses may not be received due to a delay in the operation of switching elements, and due to stray line pulses, more impulses may be counted than did originally exit. To eliminate such sources of error, the impulse control requires an additional controlling device for the correct transmission of values. This controlling device requires a large amount of expensive switching means and control members.

Other known systems for transmitting values work with direct contact making from the figure keys to switching magnets associated with the office machines connected to the figure keys. The switching magnets are either incorporated in the office machine and form a component part of the machine or they are attached to the keyboard where they hinder easy manipulation thereof. Such switching magnets are of heavy construction to enable the keys to be operated satisfactorily.

It is the object of the present invention to provide a system for exactly transmitting values between mechanically driven and electrically controlled calculating machines, which system works with transmitters and receivers and alternately transmits electrically the values between the machines connected together.

The system according to the invention comprises an auxiliary attachment containing a transmitter and a receiver for each calculating machine, selector keys and leads from said selector keys and leads for values for selectively connecting the transmitter of each auxiliary attachment to the receivers of other auxiliary attachments, mechanical parts in the transmitter for converting the figures of the calculating machine into electrical values and for transmitting said values, mechanical means in each receiver for reconverting received electrical values into figures, a common voltage source for supplying like potential of a fixed contact potential series for like figures in each denomination to the transmitters and receivers of all auxiliary attachments, a voltage comparing device consisting of a relay for each receiver, said voltage comparing device releasing the transmission of the values only when the comparison voltages are in exact conformity, slider contact arms and contact boards for the transmitter to convert the figures keyed in into voltage potentials and to transmit said voltage potentials, a wiper contact arm and a contact bank for the receiver, said wiper contact arm serving for selecting oncoming voltage potentials from the fixed contact potential series of said contact bank, stages for transmitting the selected potential corresponding to the received figure to the calculating mechanism of the receiving calculating machine, and value sensing means for said calculating mechanism for receiving said selected potential.

The transmitter and receivers of all electrically connected machines have the potentials for the same figures in each denomination in a fixed contact potential series from a common voltage source, e.g. "6" in the units decade has the same potential as "6" in the tens decade. The value transmission is released only when the voltages in the transmitter and receiver of the connected machine are the same.

The voltage comparing device is constructed in the form of a relay.

A preferred embodiment of the invention is illustrated diagrammatically by way of example in the accompanying drawings, in which:

FIG. 3 shows three calculating machines connected together, each having one auxiliary attachment containing the voltage transmitter and the voltage receiver.

Figure 1:
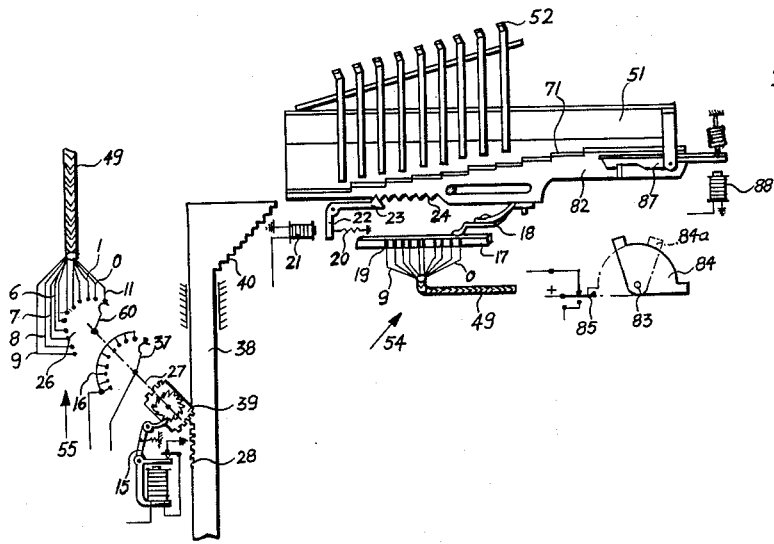
FIG. 1 shows a portion of a calculating machine having a voltage transmitter and a voltage receiver according to the invention.
Figure 4:
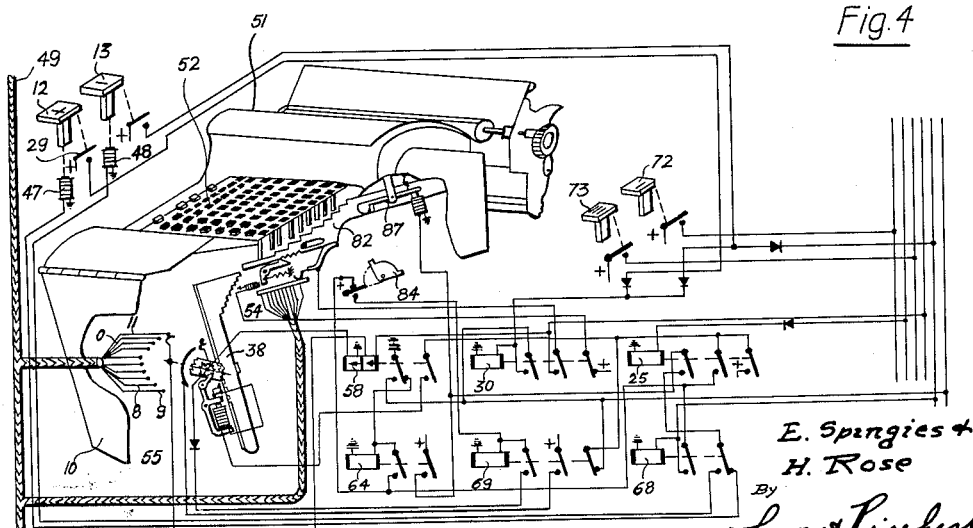
FIG. 4 shows the position of the auxiliary attachment containing the voltage transmitter and voltage receiver, on one of the calculating machines shown in FIG. 3.

Referring to FIG. 1, a calculating machine 51 with a keyboard 52 has a voltage transmitter 54 and a voltage receiver 55 forming an auxiliary attachment to this calculating machine. As can be seen from FIG. 3, this auxiliary attachment has selector keys 72 and 73 (see also FIG. 4) for the connection of further calculating machines $51^1$ and $51^2$ to the calculating machine 51. Each calculating machine further connected requires one further selector key. The auxiliary attachment contains also a relay 30 for the voltage transmitter 54 and relays 25, 58, 64, 68, and 69 for the voltage receiver 55 so that this voltage transmitter and this voltage receiver can transmit values to, and receive values from, respectively, other calculating machines $51^1$, $51^2$, etc.

The auxiliary attachment has a housing 10 (FIG. 4) which is secured to the respective calculating machine 51 and contains the voltage transmitter 54, the voltage receiver 55, the selector keys 72 and 73 and the relays 30, 25, 58, 64, 68, and 69.

As shown in FIG. 1, the voltage transmitter 54 has for each denomination a contact board 17 (only one being shown on the drawings) carrying ten contacts 19. A slider contact arm 18 is affixed to a value sensing member 82. The contacts 19 are positioned serially in the direction of movement of the slider contact arm 18 and arranged to correspond to the distance of value stages 71 of the value sensing member 82. Voltages for the values from 0 to 9 are applied to the contacts 19. Provided in addition to a known unlocking device 87 is a locking device 22 for the value sensing member 82 which consists of a locking pawl 23, a spring 20 and a magnet 21. The locking pawl 23 engages in a ratchet 24 which can be provided on the value sensing member 82.

The voltage receiver 55 has for each denomination a selector 15 with two contact banks 16 and 26. Mounted on a selector axle 27 is a toothed segment 39 which, when it rotates, causes a bar 38 to move by means of a rack 28. The bar 38 has stages 40 corresponding in depth to the value stages 71 of the value sensing member 82. On being switched to the receiving of values, the unlocked value sensing member 82 is limited in its movement by the stages 40. The bar 38 returns to the initial position due to its own weight when the toothed segment 39 lies with its sides having no teeth parallel to the bar 38.

The voltage receiver 55 possesses a pull magnet 88 which can operate simultaneously all parts of the unlocking device 87 of the calculating machine. The voltage receiver 55 further has wiper contact arms 60 and 37 on the selector axle 27, the wiper contact arm 60 tapping from the contact bank 26 the control voltages 0 to 9 supplied from a source of current 14 (FIG. 2) via a cable 49.

When the calculating machine 51 is switched in by the depression of a plus key 12 (FIGS. 3 and 4) to perform a calculating operation, a limiter disc 84 on a main control shaft 83 is caused to rotate into position 84a where it operates a make-and-break contact 85 and whence it returns immediately. The make-and-break contact 85 serves for the control of the relays 64, 68 and 69.

Figure 2:
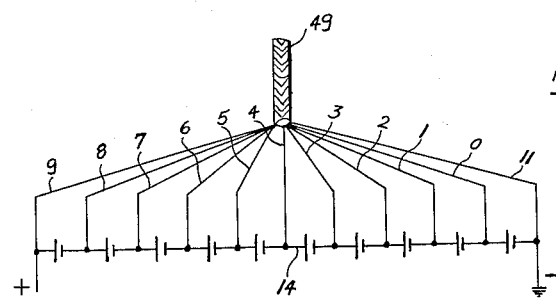
FIG. 2 shows the source of current with the voltage potentials.

The transmission of values is effected by fixed voltage potentials. A predetermined voltage is fixed for each numerical value from 0 to 9, e.g. 6 volts for value 0, 12 volts for value 1, 18 volts for value 2, etc. In their various denominations such as ones, tens, etc., the numerical values 0 to 9 are always represented by like voltages. These voltages are taken from the subdivided source of current 14 (FIG. 2). All transmitters and receivers work with like voltages for like numerical values. The individual transmitters and receivers are connected to the power source 14 by the cable 49. The positive pole and the negative pole of the source of current 14 serve at the same time for supplying current to relays, switching magnets, selectors, etc. of the total installation. The negative pole is represented as an earth pole 11.

The transmission of values has been shown only for one denominational order in the drawings. In the other denominational orders the voltages for the individual values are similarly transmitted. For each denominational order the relay 30 has a contact 31, each with a lead 56.

A numerical example illustrating the operation of the interconnected devices is described hereinafter with reference to FIG. 3. The problem to be solved is: "23"+ "39"—"12". These values are to be transmitted from the calculating machine 51 to the calculating machine 51¹. For this purpose the voltage transmitter 54 of the calculating machine 51 and the voltage receiver 55 of the calculating machine 51¹ cooperate. The calculating machine 51¹ is first switched on through the selector key 72 and a lead 50, and the relay 25 of the auxiliary attachment of the calculating machine 51¹ is energized, the relay 25 being held through a contact 41 on the make-and-break contact 85 of the calculating machine 51¹.

First the value "23" is depressed on the keyboard 52 of the calculating machine 51. Then the plus key 12 is actuated and the calculating machine 51 prints the value "23" in a known manner. The plus key 12 has a contact 29 through which the relay 30 is energized to open a contact 33 associated therewith and thereby to deenergize the magnet 21. The magnet 21 is energized as the system is switched on and attracts the locking device 22 thereby lifting the locking pawl 23 out of the ratchet 24 so that the value sensing members 82 are disengaged. Each decade has one value sensing member 82. When the magnet 21 is deenergized, the locking pawl 23 reengages the ratchet 24 and retains the value sensing member 82. The value sensing members 82 are locked in the positions reached by entering the value "3" in the units decade and the value "2" in the tens decade.

The energized relay 30 is held through a contact 34, a lead 35 and a contact 36 of the relay 69, arranged in the auxiliary attachment of the calculating machine 51¹. The contact 36 receives its voltage through a closed contact 43 of the relay 25. The contacts 31 of the relay 30 of the calculating machine 51 transmit the voltages for the value "3" in the units decade and for the value "2" in the tens decade from the slider contact arms 18 of the voltage transmitter 54 through the lead 56 in the units decade and the lead 56 in the tens decade to the relay 58 in the units decade and the relay 58 in the tens decade in the voltage receiver 55 of the calculating machine 51¹.

In the hundreds decade, and any further decades, the value "0" is transmitted as voltage for each decade from the slider contact arms 18 through the contacts 31 of the relay 30 and through the leads 56 to the relays 58 of the selectors 15 in the voltage receiver 55.

One end of the windings of the relays 58 is connected through the leads 56 with the voltage values. The other end of the windings of the relays 58 is connected via leads 44, the wiper contact arms 60, and the contact banks 26 of the selectors 15 with the grounded pole 11. The relays 58 are energized and via contacts 61 apply voltage to the selectors 15 which then make as many switching steps as the relays 58 have voltage values through the wiper contact arms 60 being in contact with the contact banks 26. The selector 15 in the units decade makes four switching steps, the selector 15 in the tens decade makes three switching steps, and the selectors 15 in the remaining decades transmitting the value "0" each make one switching step. A contact 62 of the relay 58 in the operative position charges a condenser 63.

The relays 58 drop in the positions of the wiper contact arms 60 for the voltage values and apply the charge of the condenser 63 to the relay 64 which is energized to operate a contact 66 associated therewith. The relay 64 is held via a contact 65 on the make-and-break contact 85. As the selectors 15 operate they also turn the toothed segments 39 and lift the bars 38 so that the stages 40 corresponding to the values in each decade are located in front of the value sensing members 82, i.e. in the units decade the value "3" and the stage "4", in the tens decade the value "2" and the stage "3", and in the further decades the value "0" and the stage "1" are located in front of the value sensing member, 82. The contact 66 applies voltage to the magnet 88 which unlocks the value sensing members 82. The unlocking device 87 consists of a stop pawl with a rocking lever and a latch hooked to a pin of the value sensing member 82. Such stop pawls are known in any normal calculating machine; see U.S. Patents 2,744,682, 2,497,784, 2,332,755 (actuator rack 68, stop pawl 82) and 2,724,550. In the known machines the unlocking is effected by depressing a key. In the present application the magnet 88 unlocks the rocking lever against the action of a spring. The contact 66 also applies voltage via a contact 42 of the relay 25 and via a make-and-break contact 67 of the relay 68 to a magnet 47 which actuates the plus key 12 of the calculating machine 51¹. The calculating machine 51¹ is set to work and advances the unlocked value sensing members 82 until they butt against the stages 40 of the rods 38 which are in their value receiving positions, since the rods 38 have been lifted. The value "0000000023" transmitted by the calculating machine 51 is then received by the calculating machine 51¹ and the figure "23" is printed. The mechanical calculating mechanism of the calculating machine 51¹ has now been set to the value "23".

During the operation of the calculating machine 51¹, the main control shaft 83 with its limit disc 84 is turned in known manner into the position 84a and actuates the make-and-break contact 85 to bring the voltage receiver 55 of the calculating machine 51¹ and the voltage transmitter 54 of the calculating machine 51 into their respective home positions. The shifted make-and-break contact 85 breaks the permanent energization (holding voltage of the relays 64 and 25) and energizes the relay 69 provided with a contact 70 which applies voltage to the contact banks 16 of the selectors 15. Through the wiper contact arms 37 of the contact banks 16 voltage is transmitted to the second winding of the relays 58 to actuate the contacts 61 thereof and to turn the selectors 15 until the wiper contact arms 37 have reached their home positions and the relays 58 are deenergized. The relay 69 is held in the meantime through a contact 45 associated therewith by the wiper contact arms 37. By deenergizing the relay 64 and the contact 66, voltage is removed from the magnet 88 so that the value sensing members of the calculating machine 51¹ are again locked.

By energizing the relay 69 also, the contact 36 is opened which removes voltage from the lead 35 so that the relay 30 in the calculating machine 51 is deenergized and drops. The contact 33 of the relay 30 closes again, and the magnet 21 responds to unlock the value sensing members 82 in the machine 51, which sensing members return into their home positions. Thus, the slider contact arms 18 of the voltage transmitters 54 likewise move into their home positions.

The transmission of the addition value "39" from the calculating machine 51 to the calculating machine 51¹ is effected in the same manner as described. The figure "0000000039" is transmitted and the calculating machine 51¹ prints the value "39." The mechanical calculating mechanism in the calculating machine 51¹ has now been set to the total "23"+"39"="62."

The calculating machine 51 also has a minus key 13 which is actuated to transmit the negative value "12" and the described operating is repeated in the same manner. By the minus key 13 the relay 68 of the calculating machine 51¹ is additionally energized via a lead 32. The relay 68 is held through a contact 46 thereon by the make-and-break contact 85 and shifts its make-and-break contact 67 to energize a magnet 48 for the minus key 13 of the calculating machine 51¹. The figure "0000000012" is transmitted from the calculating machine 51 and the negative value "—12" is printed in the calculating machine 51¹ and subtracted in known manner in the mechanical calculating mechanism. The mechanical calculating mechanism of the calculating machine 51¹ has now been set to the sum total "62—12=50."

In the described numerical example the values are transmitted from the calculating machine 51 to the calculating machine 51¹. Through the selector key 73, the values may also be transmitted to the calculating machine 51². The calculating machine 51² is connected for value reception via a lead 53.

In the same manner the voltage receiver 55 of the calculating machine 51 may be connected via a lead 57 and the voltage receiver 55 of the calculating machine 51² may be connected via the lead 53 to the voltage transmitter 54 through the intermediary of selector keys. Also further calculating machines provided with the auxiliary attachment may be connected for value transmission.

We claim:
1. A system for interconnecting a plurality of calculating machines for remote operation of one by another, said system including a plurality of calculating machines, each of said machines having movable members which represent numerical values within said machine by the amount of movement of said members and first means for stopping the movement of said members at positions determined by the insertion of values to be computed, means for selecting electrical potentials unique for each amount of movement and stopped position of said members for representing said values to be computed by said potentials, means for selecting a remote calculating machine of said plurality of calculating machines to be controlled by each machine, means for transmitting potentials representing numerical values from a machine to said selected machine, means for receiving from other machines potentials representative of numerical values, second means for stopping the movement of said members, means for setting said second stop means comprising an electrical drive means for said second stop means, said drive means being operable in steps, potential comparing means for comparing potentials received from remote controlling machines with potentials locally available in a prescribed sequence, means for energizing said drive means for each potential comparison until said potentials are balanced, a latch for each of said movable members, and means for tripping said latch to release said members for movement when values are inserted either through the machine keyboard entry mechanism or by a remote machine to permit said members to move.

2. A system for interconnecting a plurality of calculators for the remote operation of one of said calculators by another, each of said calculators having movable members which represent numerical values by the extent of their movements, means at each machine for inserting numerical values in that machine, said insertion means controlling the movement of said members by adjustable stops, a transmitter connected to each machine, said transmitter including means for selecting a unique electrical potential for each amount of movement of said member to represent numerical values by unique potentials also, means in each transmitter for selecting which other machine of the plurality of machines is to be remotely controlled by one of said machines, means for transmitting potentials representative of numerical values from one machine to the selected other machine, each of said machines further including a receiver, each of said receivers comprising adjustably positioned elements for controlling the movement of said members, drive means for said elements, said drive means operating to drive said elements in steps to each of a sequence of positions, potential comparison means for comparing potentials received from other controlling machines with potentials locally available, said comparisons being performed in discrete steps, and means for energizing said drive means for each comparison step until the potentials being compared are balanced.

3. The system defined in claim 2 wherein each machine further includes a latch for each of said movable members to lock said members in their home positions, means under the control of the machine itself for releasing said latch means when numerical values are to be inserted, and means under the control of a remote controlling machine for releasing said latch means when values are received from another machine.

References Cited in the file of this patent
UNITED STATES PATENTS

| | | |
|---|---|---|
| 2,497,784 | Mehan et al. | Feb. 14, 1950 |
| 2,540,524 | Houghton | Feb. 6, 1951 |
| 2,793,806 | Lindesmith | May 28, 1957 |
| 2,981,466 | Beall et al. | Apr. 25, 1961 |